US006044206A

United States Patent [19]

Kohn

[11] Patent Number: 6,044,206

[45] Date of Patent: Mar. 28, 2000

[54] OUT OF ORDER INSTRUCTION PROCESSING USING DUAL MEMORY BANKS

[75] Inventor: Leslie Kohn, Fremont, Calif.

[73] Assignee: C-Cube Microsystems, Milpitas, Calif.

[21] Appl. No.: 08/949,991

[22] Filed: Oct. 14, 1997

[51] Int. Cl.[7] .......... G06F 9/38

[52] U.S. Cl. .......... 395/200.78

[58] Field of Search .......... 395/553, 200.43–200.46, 395/200.78, 376–379; 711/147, 150

[56] References Cited

U.S. PATENT DOCUMENTS

| | | | |
|---|---|---|---|
| 4,394,727 | 7/1983 | Hoffman et al. | 395/673 |
| 5,239,641 | 8/1993 | Horst | 395/553 |
| 5,276,828 | 1/1994 | Dion | 395/200.78 |
| 5,438,680 | 8/1995 | Sullivan | 395/200.78 X |
| 5,440,750 | 8/1995 | Kitai et al. | 395/553 X |
| 5,448,310 | 9/1995 | Kopet et al. | 348/699 |
| 5,453,799 | 9/1995 | Yang et al. | 348/699 |
| 5,619,268 | 4/1997 | Kobayashi et al. | 348/416 |
| 5,623,313 | 4/1997 | Naveen | 348/416 |
| 5,648,819 | 7/1997 | Tranchard | 348/416 |
| 5,650,823 | 7/1997 | Ngai et al. | 348/415 |
| 5,802,374 | 9/1998 | Gupta et al. | 395/553 X |

OTHER PUBLICATIONS

Varhol, P. "Mainstream processors gain DSP features," *Hardware*, pp. 29–32, Sep. 1997.

*Primary Examiner*—Thomas M. Heckler
*Attorney, Agent, or Firm*—Fish & Richardson P.C.

[57] ABSTRACT

A process of synchronizing two execution units sharing a common memory with a plurality of memory banks starts by assigning a first memory bank to a one of two execution units. The other memory bank is assigned to the other execution unit. Then a sequence of operations is processed within one of the execution units while another sequence of operations is processed within the other execution unit. When the first execution unit completes a sequence of operations, a synchronizing operation is performed which causes that first execution unit to suspend processing if a corresponding sequence of operations in the other execution unit has not been completed. When both execution units have completed their respective sequences of operations, the assignment of memory banks is swapped between the two execution units, thereby preventing erroneous reads and writes.

23 Claims, 1 Drawing Sheet

OUT OF ORDER INSTRUCTION PROCESSING USING DUAL MEMORY BANKS

BACKGROUND OF THE INVENTION

This invention relates to a video encoder-decoder ("codec") system used for processing video data streams. Preferably the system is incorporated on a single silicon chip.

The emergence of multimedia computing is driving a need for digitally transmitting and receiving high quality motion video. The high quality motion video consists of a plurality of high resolution images, each of which requires a large amount of space in a system memory or on a data storage device. Additionally, about 30 of these high resolution images need to be processed and displayed per second in order for a viewer to experience an illusion of motion. As a transfer of large, uncompressed streams of video data is time consuming and costly, data compression is typically used to reduce the amount of data transferred per image.

In motion video, much of the image data remains constant from one frame to another frame. Therefore, video data may be compressed by first describing a reference frame and then describing subsequent frames in terms of changes from the reference frame. Standards from an organization called Motion Pictures Experts Group (MPEG) have evolved to support high quality, full motion video. A first standard (MPEG-1) has been used mainly for video coding at rates of about 1.5 megabit per second. To meet more demanding application, a second standard (MPEG-2) provides for a high quality video compression, typically at coding rates of about 3–10 megabits per second.

The codecs of this invention are used, for example, to MPEG encode video information to be recorded onto a digital video disc (DVD). DVDs are becoming popular as a lower cost, higher picture quality medium to store movies. MPEG encoding allows digital video and audio information to be placed on a DVD the size of a conventional audio CD. These 5-inch DVD discs are rapidly replacing the older 12-inch laser discs for movies in the consumer marketplace because they are smaller yet hold more information.

Efficient video processing can be achieved by overlapping processing by multiple execution units. For example, three separate execution units, a DMA execution unit, a RISC core execution unit and a video digital signal processor (DSP) execution unit all will execute the same instruction set. The RISC core execution unit and the video DSP execution unit are used to carry out the processing on the codec chip, while the DMA execution unit is used to access external memory. One instruction is fetched each clock cycle by the RISC core execution unit from an instruction cache, and that instruction is then dispatched to another appropriate execution unit according to the instruction's opcode. DSP and DMA instruction operands and results are stored in a shared memory located between the DMA and DSP execution units.

The integer data path of the RISC core execution unit has an unshared memory, typically a register file. This integer data path directly processes simple instructions such as add, branch and other RISC integer instructions. Accordingly, these instructions are typically executed at the rate they are dispatched to the execution unit, eliminating the need for an instruction queue.

The remainder of the instructions are passed either to the DMA execution unit or to the video DSP execution unit. Both of these execution units often take many computer cycles to execute an instruction. Therefore instructions for these execution units are placed into one of two instruction queues for execution by one or the other of the two execution units so that delays in one execution unit do not affect instructions dispatched to the other execution unit or to the RISC core execution unit. These queues hold pending instructions for the video DSP and for the DMA execution unit. This architecture causes delayed instructions to be executed out of order with respect to the original instruction stream fetched by the RISC core execution unit.

Prior art multiple execution unit systems using out-of-order execution and shared memory generally have synchronized instruction execution using a hardware detection system to catch read-after-write, write-after-read and write-after-write hazards which occur when a shared memory structure is used for two execution units. A read-after-write hazard occurs when an instruction tries to read a register while a previous instruction is still in the process of being completed and uses the same register as its destination. Therefore the data which will be read isn't the correct data.

A write-after-write hazard is where there is an instruction in process that completes and its result needs to be written into a register. However, there is an earlier instruction, the results of which are intended to be written to the same register, but the instruction execution isn't yet completed. If the result of the completed instruction were written into the register, then when the earlier instruction finally is completed, it will overwrite the later instruction's result. If each execution unit had its own register set, this couldn't happen. But it is not practical to use separate registers for each execution unit because data must be shared between the two execution units.

When a read-after-write hazard is detected, the execution of the later instruction must be blocked until the earlier instruction updates the shared memory. When a write-after-write hazard is detected, the later instruction's shared memory update must be blocked until the earlier instruction first updates the shared memory.

To accomplish these blocking corrections, one example of prior art hardware records the identities of: (1) all the destination registers of the outstanding instructions and (2) all the instructions that are waiting to be dispatched including the source registers for the instructions. Each time an instruction is completed by one of the execution units, the prior art hardware checks if there are any other outstanding instructions having the same destination register as the completed instruction. If not, all the instructions waiting to be dispatched are checked to see if all necessary earlier instructions which are required in order to issue the new instruction have been completed.

A compare must be carried out against all the instructions waiting to be dispatched, and the oldest instruction must be selected, which is then dispatched to the execution unit during that cycle. As instructions complete, there must be no older instructions in other execution units which write to the same destination register. Detecting the existence of such instructions is a complicated operation which must be done in parallel for all execution units.

This complicated prior art hazard handling procedure represents a timing bottleneck, as it must be done in a single clock cycle. Moreover, such hazard detection requires extensive hardware to compare the source and destination addresses as well as the ages of all outstanding instructions. Moreover, even more complicated hazard handling schemes, such as register renaming and result reorder buffering, also have been used in the prior art.

SUMMARY OF THE INVENTION

The method and apparatus of this invention eliminates a substantial portion of the hazard detection hardware required by the prior art by making use of a dual bank, shared memory structure and a method of swapping the assignment of memory banks between two execution units. Briefly, the method and apparatus of the invention for synchronizing two execution units sharing a common memory with a plurality of memory banks starts by assigning a first of the plurality of memory banks to a one of two execution units. The other memory bank is assigned to the other execution unit. Then a sequence of operations is processed within one of the execution units while another sequence of operations is processed within the other execution unit. When the first execution unit completes a sequence of operations, a synchronizing operation is performed which causes that first execution unit to suspend processing if a corresponding sequence of operations in the other execution unit has not been completed. When both execution units have completed their respective sequences of operations, the assignment of memory banks is swapped between the two execution units, thereby preventing erroneous reads and writes.

The method and apparatus of this invention eliminate the extensive hazard detection hardware of the prior art used to compare source and destination addresses and to keep track of the ages of all outstanding instructions.

DESCRIPTION OF THE PREFERRED EMBODIMENT

Figure 1:
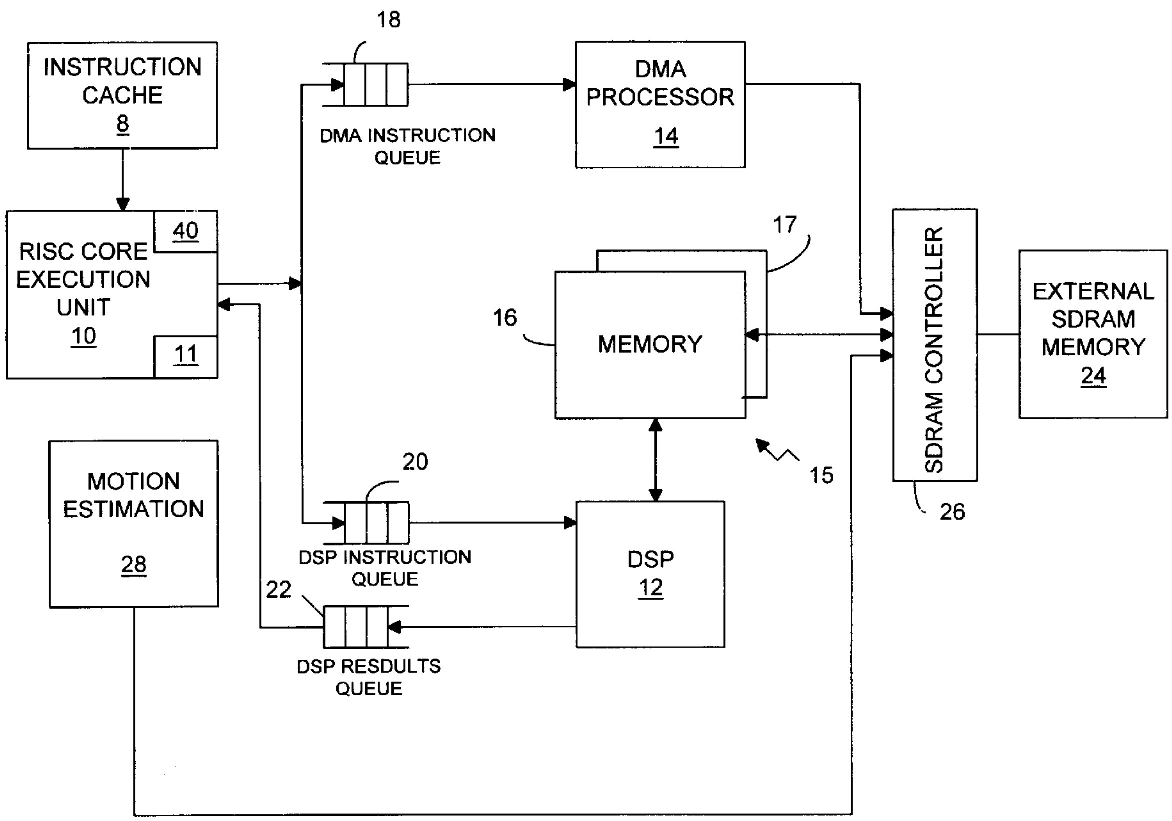
FIG. 1 is a block diagram of the multiple execution unit, shared memory apparatus of the invention.

As shown in FIG. 1, the invention includes three execution units. The first is a RISC core integer data execution unit 10; the second is a video DSP execution unit 12; and the third is a direct memory access (DMA) execution unit 14. DMA execution unit 14 and video DSP execution unit 12 share a common, dual bank memory 15. The first memory bank 16 is illustrated in front of the second memory bank 17. Video DSP execution unit 12 and DMA execution unit 14 always access different banks of memory 15 so that while DMA transfers from DMA execution unit 14 are being performed in one of the two banks 16 or 17, DSP operations from video DSP execution unit 12 may be performed in the other of the two banks. This dual bank structure eliminates write-after-write hazards and read-after-write hazards because the results from each execution unit go into a different and separate memory bank. Of course both banks may reside on a single DRAM or SRAM chip. They merely must be architecturally distinct.

The results created by one execution unit and stored in one of memory banks 16 or 17 often must be made visible to the other execution unit. To accomplish this, the system uses a unique swap instruction to cause the role of each of memory banks 16 and 17 to be reversed. This allows the data which was written by DMA execution unit 14 to one of the banks of memory 15 before the swap to be read by the video DSP execution unit 12 after the swap. By the same token, the results of operations on data in one memory bank by the DSP execution unit 12, which were obtained before the swap, will be available in the swapped memory bank after the swap for write operations by the DMA execution unit 14 to the external SDRAM memory 24 through SDRAM controller 26.

The swap instruction is issued both to DSP instruction queue 20 and to DMA instruction queue 18 by the RISC core execution unit 10. When a swap instruction reaches the head of one of the two instruction queues 18 or 20, it causes the respective execution unit attached to that queue to wait until a corresponding swap instruction reaches the head of the other instruction queue. This ensures that the two units remain synchronized.

Motion estimation unit 28 computes the motion vectors to be used for motion compensation in MPEG encoding. Selected results from motion estimation unit 28 are retrieved from SDRAM 24 and used as operands for motion compensation instructions for DMA execution unit 14. Motion estimation unit 28 is more fully described in U.S. patent application Ser. No. 08/950,379 filed Oct. 14, 1997 by the same inventor and assigned to the same assignee as the subject invention.

An advantage of the dual bank memory system of the invention is its relatively small size compared to traditional, dual-ported, shared memory structures. Single-ported memory banks 16 and 17 require only half the bitlines and half the wordlines of a dual-ported memory cell.

A preferred embodiment of this invention uses a special synchronization mechanism for transmitting computation results between video DSP execution unit 12, DMA execution unit 14 and RISC core execution unit 10. Results generated from the RISC core execution unit 10 are transmitted to the video DSP execution unit 12 or to the DMA execution unit 14 along with instructions through the respective video DSP instruction queue 20 or DMA instruction queue 18. Those DMA and video DSP instructions will be delayed by RISC core execution unit 10 if a previous RISC core instruction is delayed, thereby preventing read-after-write hazards. The particular delay mechanism used is well-known in the art and is implemented with all RISC core instructions, including those RISC core instructions which are executed in their normal order.

To prevent write-after-read hazards when an instruction is issued by RISC core execution unit 10 to DMA execution unit 14 or to video DSP execution unit 12, the data necessary for the execution of the instruction is passed along by RISC core execution unit 10 to the respective instruction queues 18 or 20 along with the instruction. Then, when the instruction is executed by the respective execution unit, the data is present along with the instruction. This prevents write-after-read hazards because the old data is saved in the instruction queue along with the instruction. If the data in register file 40 (which is part of RISC core execution unit 10) happens to be subsequently overwritten, it does not cause a problem because, when that data is later needed by DMA execution unit 14 or video DSP execution unit 12, the respective execution unit will look for the data in the respective instruction queue 18 or 20.

To prevent read-after-write and write-after-write hazards, the results of calculations made in the video DSP execution unit 12 are transmitted to the RISC core execution unit 10 through the DSP results queue 22. Separate queue entries are allocated in results queue 22 for each result generated by the video DSP execution unit 12. The order of results going into results queue 22 is tracked by software which is well-known in the art. When RISC core 10 reads an instruction from DSP results queue 22, it returns the oldest entry from the queue in the order in which results were transmitted to the queue by video DSP execution unit 12. Write-after-write hazards are thereby prevented because video DSP execution unit 12 can never overwrite a previous instruction result before the RISC core execution unit 10 has read it. Each result thus becomes a separate entry into DSP results queue 22. To prevent read-after-write hazards when the results queue is empty, the execution of instructions by RISC core execution unit 10 is delayed until the next result is fed to queue 22.

RISC core execution unit 10 includes a results queue counter 11 which keeps track of the number of queue entries reserved for retrieving results from the DSP execution unit 12 through results queue 22. Each time a DSP instruction is issued which returns a result, counter 11 is incremented. If after incrementing, the counter value is larger than the maximum number of entries allowed in the results queue, execution by RISC core execution unit 10 is transferred to a error handling procedure as is well known in the art. Each time RISC core execution unit 10 executes an instruction to read the results queue, counter 11 is decremented. If the counter value is less than 0, execution is also transferred to an error handling procedure.

The DSP results queue 22, in accordance with this preferred embodiment of the invention, is best adapted for systems which use results in the same order as they were generated, such as loop-based processing systems. DSP applications are generally loop-based.

As will be understood by those skilled in the art, many changes in the method and apparatus described above may be made by the skilled practitioner without departing from the spirit and scope of the invention, which should be limited only as set forth in the claims which follow.

What is claimed is:

1. A method of synchronizing two execution units sharing a common memory having a plurality of memory banks, comprising the steps of:

assigning a first of the plurality of memory banks to a one of two execution units;

assigning a second of the plurality of memory banks to the other of the two execution units;

processing a sequence of operations within one of the execution units while processing another sequence of operations within the other execution unit;

when a first of the two execution units completes a sequence of operations, performing a synchronizing operation which causes that first execution unit to suspend processing if a corresponding sequence of operations in the other of the two execution units has not been completed;

when both execution units have completed their respective sequences of operations, swapping the assignment of memory banks between the two execution units, thereby preventing erroneous reads and writes.

2. The method of claim 1 wherein the swapping of the assignment of memory banks is caused by each of the two execution units executing a swap instruction.

3. The method of claim 2 wherein the issued swap instructions are placed into an instruction queue, one queue for each of the two execution units.

4. The method of claim 3 further including the step of suspending issuing additional swap instructions until the oldest swap instruction has been removed from the instruction queues of both execution units.

5. A method for synchronizing a plurality of execution units where one unit is transmitting instructions and data to the other, comprising:

transmitting coupled instructions and data in sequential order from one execution unit to the other;

processing the instructions and data in the other execution unit;

transmitting the results of the processing of instructions and data from the other execution unit in the same sequential order as the instructions and data were received to a results queue which holds the results in the order received; and reading the results from the results queue in the same sequential order as they appear unless the results queue is empty, in which case instruction execution by the one execution unit is suspended until the next result is passed to the results queue by the other execution unit.

6. The method of claim 5 further including the step of, prior to transmitting an instruction and data from the one execution unit, checking to ascertain if there is available space in the results queue, and if not, transferring the one execution unit to an error handling procedure.

7. The method of claim 5 further including the step of, prior to reading the results from the results queue, checking to ascertain if there are any outstanding operations being carried out in the other execution unit which have returned or will return results, and if there are none, transferring the one execution unit to an error handling procedure.

8. Apparatus for processing data comprising:

two execution units sharing a common memory having a plurality of memory banks;

a first of the plurality of memory banks being assigned to a one of the two execution units and a second of the plurality of memory banks being assigned to the other of the two execution units;

means for processing a sequence of operations within one of the execution units while processing another sequence of operations within the other execution unit;

means for performing a synchronizing operation when a first of the two execution units completes a sequence of operations, causing that first execution unit to suspend processing if a corresponding sequence of operations in the other of the two execution units has not been completed;

means for swapping the assignment of memory banks between the two execution units when both execution units have completed their respective sequences of operations, thereby preventing read and write hazards.

9. The apparatus of claim 8 wherein one of the execution units is an integer instruction processing unit.

10. The apparatus of claim 8 wherein one of the execution units is a direct memory access execution unit.

11. The apparatus of claim 8 wherein one of the processing units is a video DSP execution unit.

12. The apparatus of claim 11 wherein another of the execution units is a direct memory access execution unit.

13. The apparatus of claim 8 wherein each of the two execution units executes a swap instruction which causes the assignment of memory banks to be swapped.

14. The apparatus of claim 13 wherein the issued swap instructions are placed into an instruction queue, one queue for each of the two execution units.

15. The method of claim 14 further including a means for suspending issuing additional swap instructions until the oldest swap instruction has been removed from the instruction queues of both execution units.

16. Apparatus for synchronizing a plurality of execution units where one execution unit is transmitting instructions and data to the other, comprising:

means for transmitting coupled instructions and data in sequential order from one execution unit to the other;

means for processing the instructions and data in the other execution unit;

means for transmitting the results of the processing of instructions and data from the other execution unit in the same sequential order as the instructions and data were received to a results queue which holds the results in the order received; and means for reading the results from the results queue in the same sequential order as they appear unless the results queue is empty, in which case further execution by the one execution unit is suspended until the next result is passed to the results queue by the other execution unit.

17. The apparatus of claim 16 further including a means for checking to ascertain if there is available space in the results queue prior to transmitting an instruction and data from the one execution unit, and if not, transferring the one execution unit to an error handling procedure.

18. The apparatus of claim 16 further including a means for checking when reading the results queue to ascertain if there are any outstanding operations being carried out in the other execution unit which have returned or will return results prior to reading the results from the results queue, and if there are none, transferring the one execution unit to an error handling procedure.

19. The apparatus of claim 16 wherein the means for transmitting coupled instructions and data includes an instruction queue.

20. Apparatus for synchronizing a plurality of execution units where one execution unit is transmitting instructions and data to two other execution units, comprising:

means for transmitting coupled instructions and data in sequential order from one execution unit to either of the other two execution units;

means for processing instructions and data in the other two execution units;

means for transmitting results from one of the other two execution units in the same sequential order as the instructions and data were received by that one of the other two execution units to a results queue which holds the results in the order received; and means within the one execution unit for reading the results from the results queue in the same sequential order as they appear in the results queue unless the results queue is empty and there are outstanding instructions that will return results, in which case further execution by the one execution unit is suspended until the next result is passed to the results queue by the other one of the two execution units.

21. The apparatus of claim 20 further including a means for checking to ascertain if there is available space in the results queue prior to transmitting instructions and data by the one execution unit, and if not, transferring the one execution unit to an error handling procedure.

22. The apparatus of claim 20 further including a means for checking when reading the results queue to ascertain if there are any outstanding operations being carried out in the one of the other two execution units which have returned or will return results prior to the one execution unit reading the results from the results queue, and if there are none, transferring the one execution unit to an error handling procedure.

23. The apparatus of claim 20 wherein the means for transmitting coupled instructions and data includes an instruction queue for each of the other two execution units.

* * * * *